United States Patent
Scott et al.

(10) Patent No.: US 7,671,509 B2
(45) Date of Patent: Mar. 2, 2010

(54) ROTOR AND STATOR ASSEMBLIES FOR PERMANENT MAGNET ELECTRIC GENERATOR

(76) Inventors: Terry D. Scott, Rt. 8, Box 758, Tulsa, OK (US) 74126; Johnny L. Scott, Rt. 8, Box 761, Tulsa, OK (US) 74126; Lawrence A. Hash, 505 W. 33$^{rd}$ St., Sand Springs, OK (US) 74063

( * ) Notice: Subject to any disclaimer, the term of this patent is extended or adjusted under 35 U.S.C. 154(b) by 35 days.

(21) Appl. No.: 11/841,184

(22) Filed: Aug. 20, 2007

(65) Prior Publication Data
US 2009/0051233 A1  Feb. 26, 2009

(51) Int. Cl.
H02K 1/00 (2006.01)

(52) U.S. Cl. .............. 310/266; 310/67 R; 310/156.26

(58) Field of Classification Search .......... 310/156.26, 310/156.28, 67 R, 261, 62, 63, 58, 266, 112, 310/114, 216, 268
See application file for complete search history.

(56) References Cited

U.S. PATENT DOCUMENTS

| | | | | |
|---|---|---|---|---|
| 3,806,744 A | * | 4/1974 | Abraham et al. | 310/49.19 |
| 4,924,125 A | * | 5/1990 | Clark | 310/67 R |
| 5,030,864 A | * | 7/1991 | Van Hout et al. | 310/67 R |
| 5,212,419 A | * | 5/1993 | Fisher et al. | 310/216.061 |
| 5,412,269 A | * | 5/1995 | Couture | 310/67 R |
| 6,727,632 B2 | * | 4/2004 | Kusase | 310/266 |
| 6,903,471 B2 | * | 6/2005 | Arimitsu et al. | 310/59 |
| 6,924,574 B2 | * | 8/2005 | Qu et al. | 310/114 |
| 6,992,419 B2 | * | 1/2006 | Kim et al. | 310/266 |
| 7,514,834 B2 | * | 4/2009 | Takeuchi | 310/184 |
| 2006/0244338 A1 | * | 11/2006 | Petersen | 310/266 |
| 2007/0205682 A1 | * | 9/2007 | Choi et al. | 310/114 |

* cited by examiner

*Primary Examiner*—Michael C Zarroli
(74) *Attorney, Agent, or Firm*—Michael A. Rahman, Esq.

(57) ABSTRACT

A permanent magnet electric generator includes a rotor assembly and a stator assembly. The rotor assembly has axially disposed annular outer and inner rings concentric with an axis of rotation. A plurality of magnets is disposed on the outer ring, each magnet having a north pole and a south pole. The permanent magnets are aligned with the axis of rotation, and adjacent magnets have alternating polarity. The stator assembly includes a plurality of stator blocks aligned to form an annular ring-shaped stator member retained by a stator frame. The stator member is configured to be at least partially disposed inside the rotor assembly and is circumferentially encircled by the rotor assembly.

14 Claims, 11 Drawing Sheets

ROTOR AND STATOR ASSEMBLIES FOR PERMANENT MAGNET ELECTRIC GENERATOR

FIELD OF THE INVENTION

The invention relates to electric generators. More specifically, the invention relates to a rotor and a stator assembly for a permanent magnet electric generator.

BACKGROUND OF THE INVENTION

An electric generator includes a stator and a rotor. The rotor is mounted on a shaft and rotates relative to the stator. The stator generally has a core of magnetic material with an electrically conductive stator winding. The rotor includes magnetic material and rotates in close relation to the stator core. When the shaft is rotated, alternating current is induced in the stator winding.

The general construction of the electric generator has not changed over the years. Improvements in construction of the generator is desired.

SUMMARY

A permanent magnet electric generator includes a rotor assembly and a stator assembly. The rotor assembly includes an axially disposed annular outer ring, which is concentric with an axis of rotation. The rotor assembly also includes an axially disposed annular inner ring, which is concentric with the axis of rotation. The inner ring has a radius less than the radius of the outer ring, and the inner ring is disposed inside the outer ring.

A rotor frame is attached to the inner ring and the outer ring to define a radial gap between the inner and the outer rings. A rotor hub is concentric with the axis of rotation and is disposed inside the inner ring. The rotor hub is coupled to the inner ring by a hub frame mounted on the rotor hub. The rotor hub is adapted to be rotationally coupled to a shaft for rotating the rotor assembly.

A plurality of permanent magnets is disposed on the outer ring. Each magnet has a north pole and a south pole. The permanent magnets are aligned with the axis of rotation and adjacent magnets have alternating polarity. The hub frame includes a plurality of radially disposed blades attached to the inner ring. The hub frame is made from an insulating material. The inner ring is made from a plurality of thin, ring-shaped magnetically permeable material.

The stator assembly includes a plurality of stator blocks aligned to form an annular ring-shaped stator member retained by a stator frame. The stator member is configured to be at least partially disposed inside a rotor assembly and circumferentially encircled by the rotor assembly. The stator member is concentric with an axis of rotation. The stator member is wound with a three-phase winding extending through gaps between adjacent stator blocks. The stator block is formed by stacking a plurality of strips of magnetically permeable material. The three-phase winding extends laterally through the gaps of adjacent stator blocks. A heat sink is attached to the stator member to dissipate heat generated during operation of the electric generator.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

in the drawings.

DETAILED DESCRIPTION OF THE INVENTION

Figure 1:
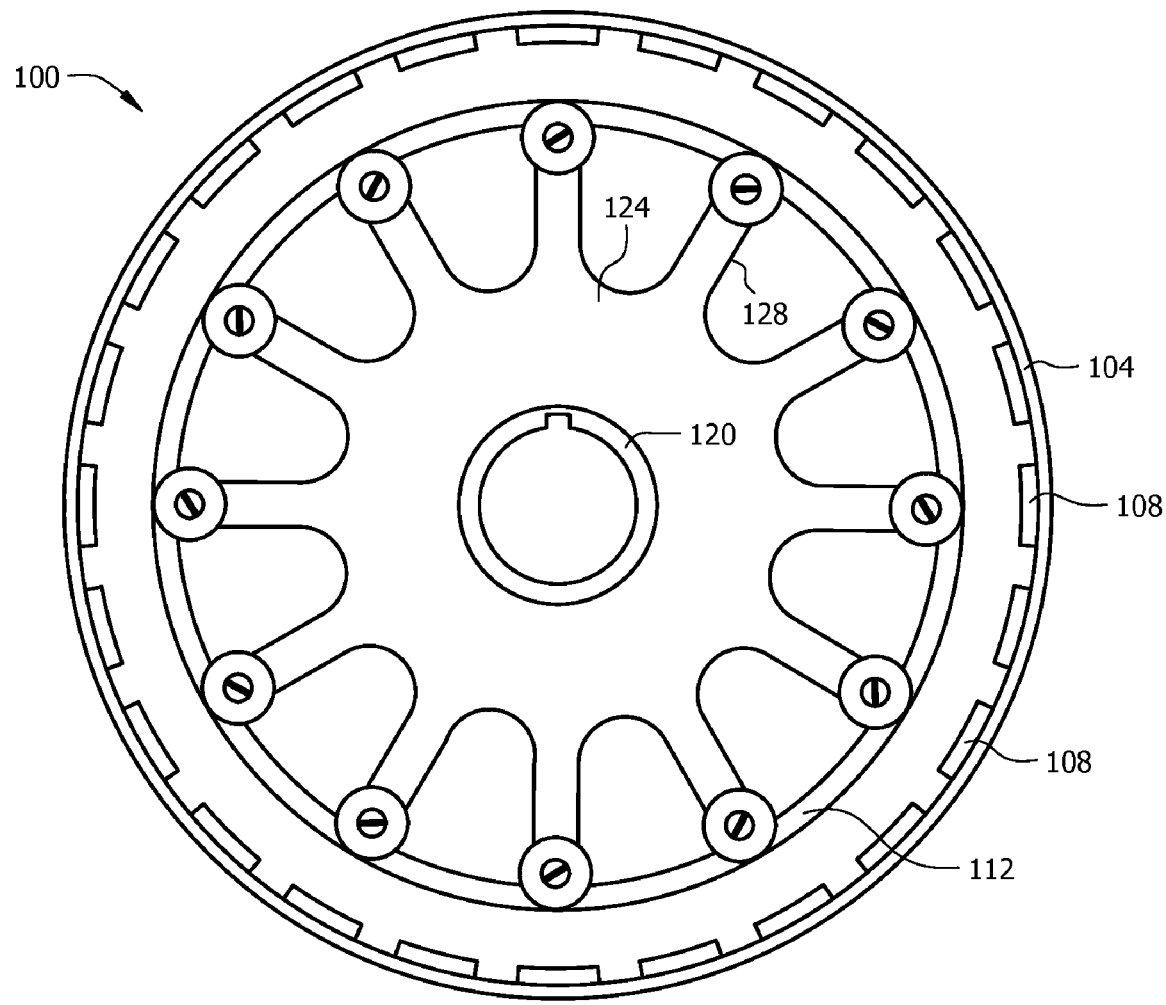
FIG. 1 is a plan view of a rotor assembly for a permanent magnet electric generator in accordance with one embodiment.

FIG. 1 is a plan view of a rotor assembly 100 for a permanent magnet electric generator in accordance with one embodiment. The rotor assembly 100 includes an axially disposed annular outer ring 104. The outer ring 104 is concentric with an axis of rotation.

In one embodiment, the outer ring 104 is made from a magnetically, permeable material. For example, Carbon, Manganese or other suitable material can be used to make the outer ring 104. In one embodiment, the outer ring is made from DOM 1018 type cold roll steel. A plurality of permanent magnets 108 is distributed on the inner surface of the outer ring 104. In one embodiment, strips of permanent magnets 108 are substantially evenly distributed so that adjacent magnets have opposite north/south polarities. The permanent magnets are aligned with the rotational axis of the rotor assembly 200.

In one embodiment, the permanent magnets 108 are epoxy potted to the body of the outer ring 104, and/or may also be banded with wire to the body of the outer ring 104, to help retain the permanent magnets 108 in place at high rotational speeds. The permanent magnets 108 may be attached to the body of the outer ring 104 by other suitable means. As will be understood by those skilled in the art, the precise number of permanent magnets 108 will be determined by the number of rotor poles desired.

The rotor assembly 100 includes an axially disposed annular inner ring 112. The inner ring is concentric with the axis of rotation and is disposed inside the outer ring. The radius of the inner ring 112 is less than the radius of the outer ring 104.

In one embodiment, the inner ring 112 is made from a plurality of ring-shaped strips.

The ring-shaped strips are stacked to form the inner ring 112, thereby resulting in a laminated structure. The ring-shaped strips are made from a magnetically, permeable material. The strips can be epoxy potted or otherwise glued together to form the inner ring 112. The strips may also be stacked and attached with washers and screws. In one embodiment, the strips of inner rings are made from Silicon Grade 6 PHML.

Figure 2:
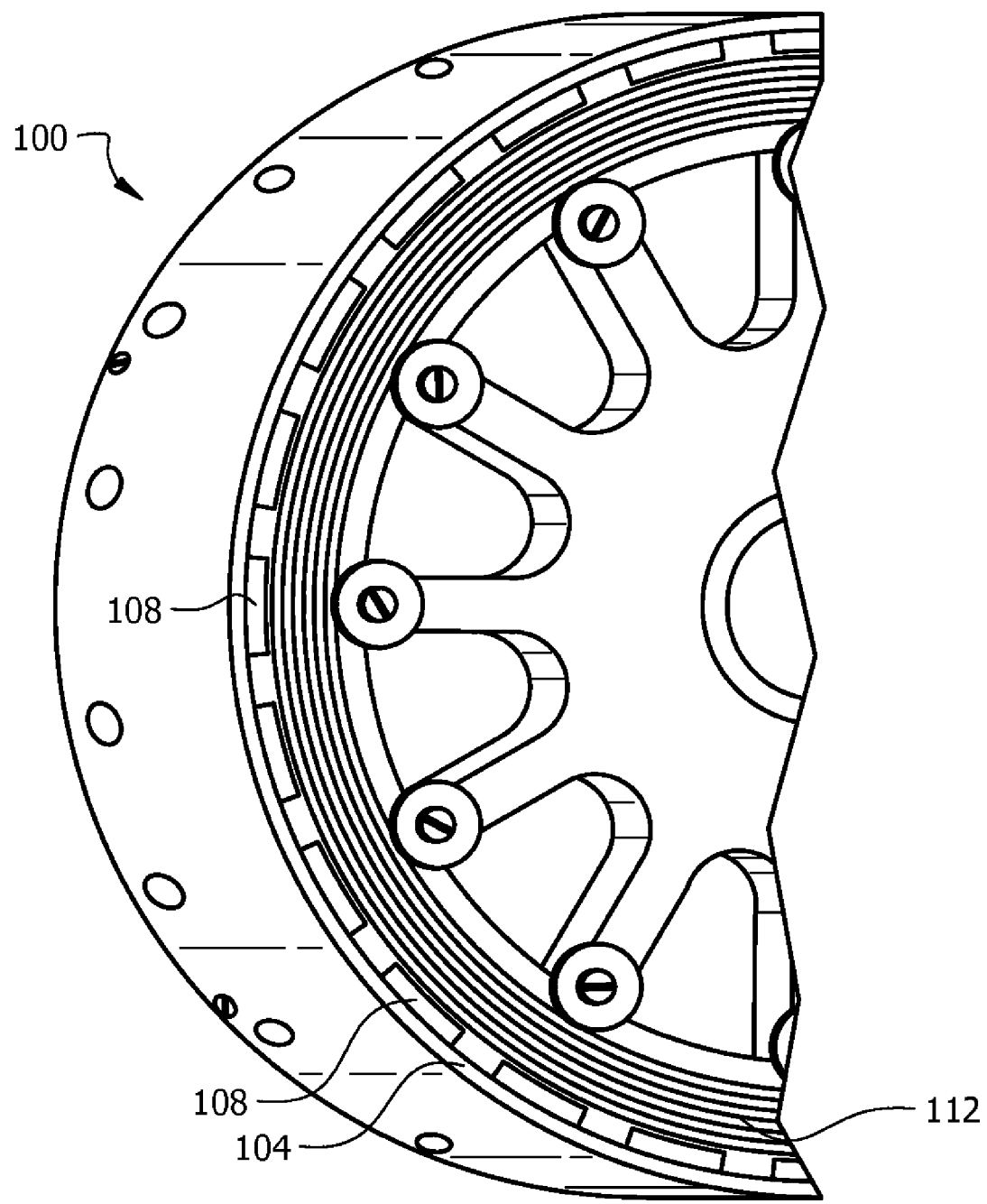
FIG. 2 is a perspective view of a section of the rotor assembly.

FIG. 2 is a perspective view of a section of the rotor assembly 100 illustrating the construction of the outer ring 104 and the inner ring 112. The outer ring 104 is made from a magnetically permeable material. A plurality of permanent magnets 108 is disposed on the outer ring 104. The inner ring 112 is constructed by a plurality of ring-shaped strips thereby forming a laminated construction as shown in FIG. 2. The inner ring 112 and the outer ring 104 are concentric with the axis of rotation. The inner ring 112 is disposed inside the outer ring 104.

Figure 3:
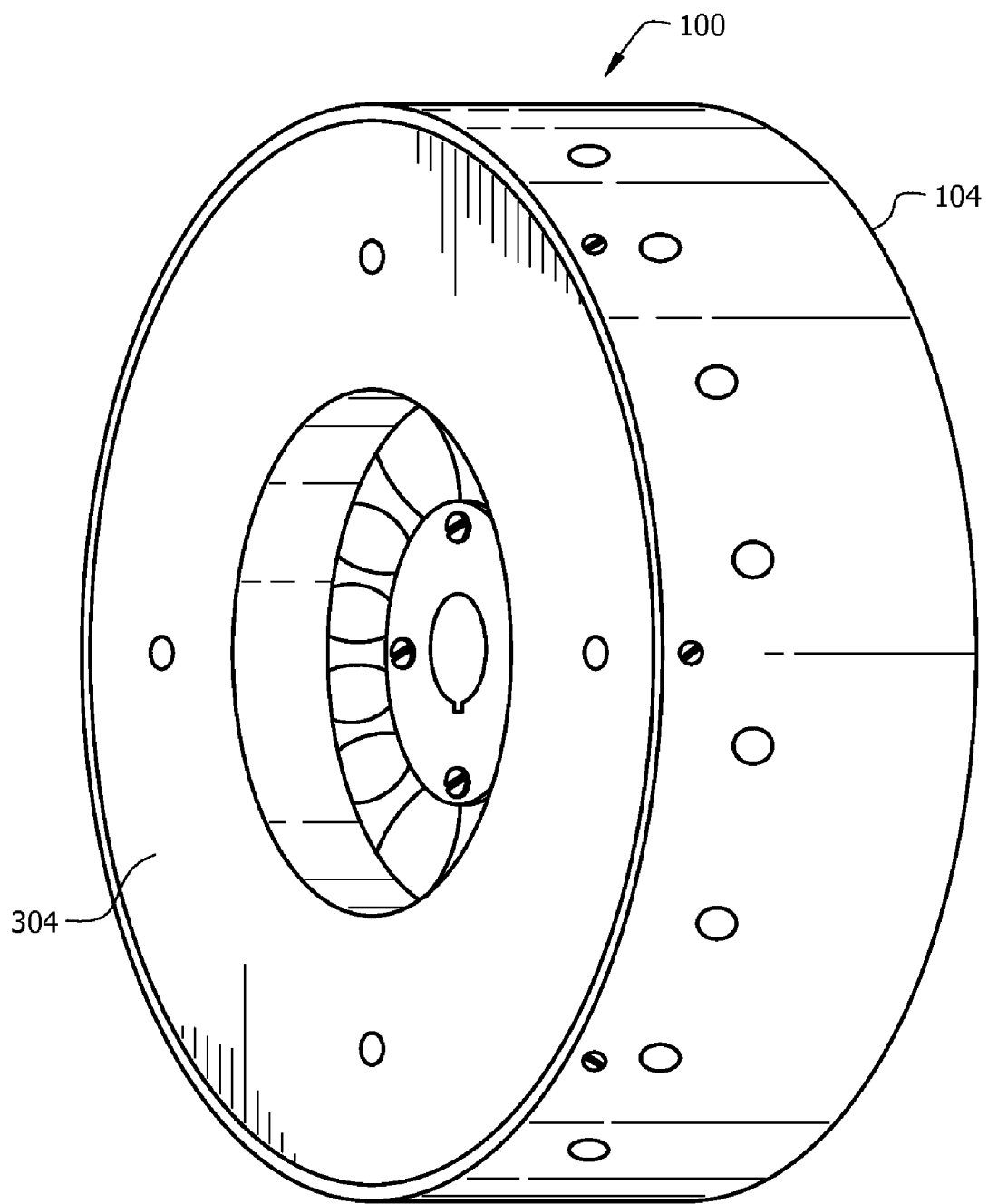
FIG. 3 illustrates a wheel-shaped rotor frame with a circular opening at the center.

Referring now to FIG. 3, wheel-shaped rotor frame 304 with a circular opening at the center securely retains the outer ring 104 and the inner ring 112 (not visible in FIG. 3). The rotor frame 304 concentrically aligns the inner and outer rings about the axis of rotation and defines a radial gap between the inner and the outer rings. The rotor frame 304 firmly retains the outer ring 104 and the inner ring 112 in alignment during high speed rotation of the rotor assembly 100. In one embodiment, the rotor frame 304 is made from an electrically insulating, composite material.

Referring back to FIG. 1, the rotor assembly 100 includes a rotor hub 120 concentric with the axis of rotation. The rotor hub 120 is disposed inside the inner ring 112 and is coupled to the inner ring 112 by a hub frame 124. In one embodiment, the hub frame 124 includes a plurality of radially disposed blades 128 attached to the inner ring 112 to securely couple the inner ring 112 to the rotor hub 120. The rotor hub 120 is rotationally coupled to a shaft (not shown in FIG. 1) for rotating the rotor assembly 100. The shaft is coupled to source of rotational energy to rotate the rotor assembly. In one embodiment, the hub frame 124 is made from an electrically insulating, composite material.

As will be appreciated, the hub frame and the rotor frame cooperatively provide structural support to the rotor assembly 100. Also, when the rotor assembly 100 is in rotation, the rotor blades create air-flow that cools the rotor assembly 100.

Figure 4:
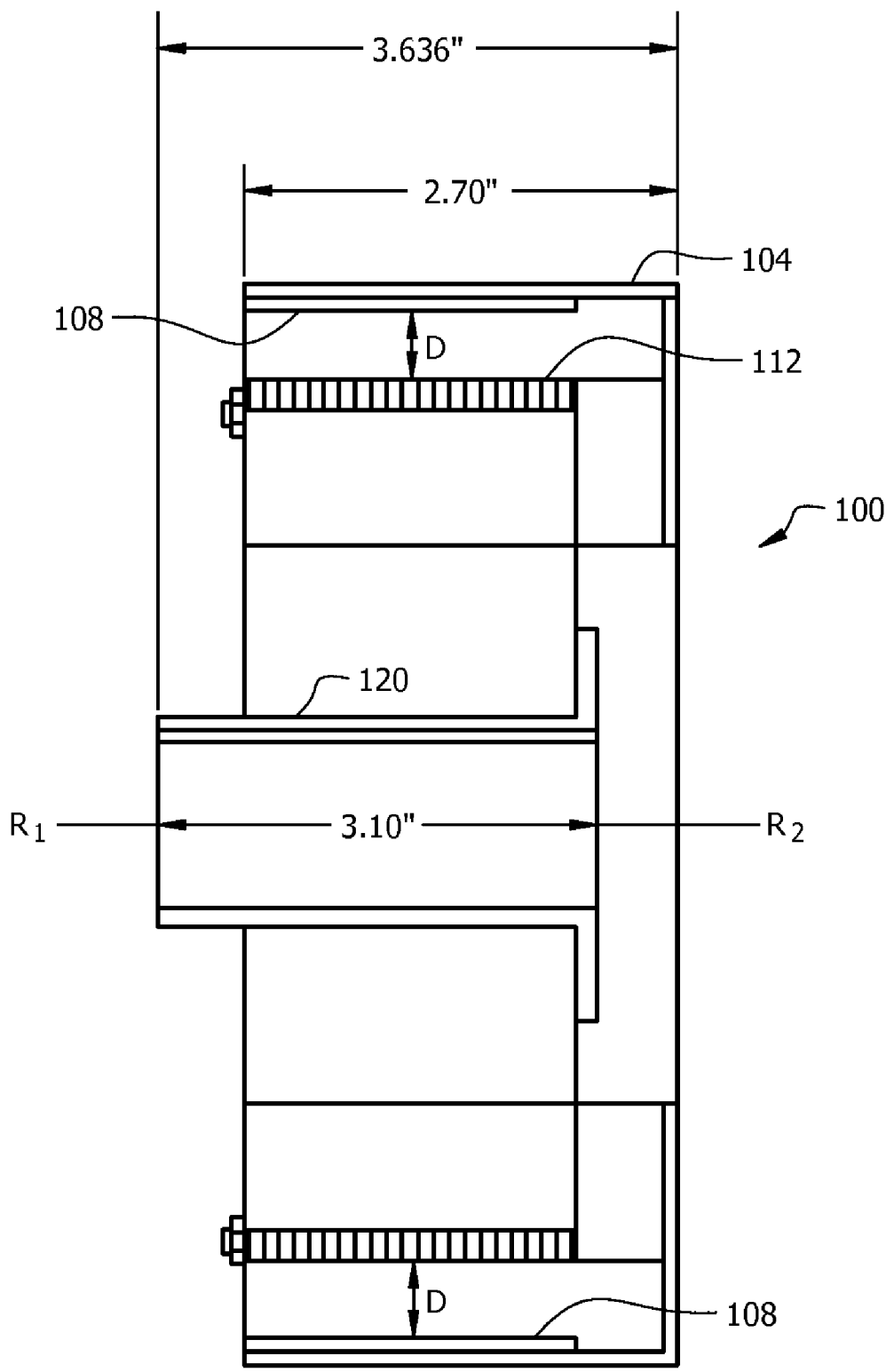
FIG. 4 is a cross-sectional view of the rotor assembly.

FIG. 4 is a cross-sectional view of the rotor assembly 100. The rotor assembly 100 comprises concentric inner and outer rings 112 and 104, respectively. The outer ring 104 is made from a magnetically permeable material. The inner ring 112 is made by bonding or stacking a plurality of ring-shaped pieces as indicated by its laminated structure. A plurality of permanent magnets 108 is attached to the inner surface of the outer ring 104. The poles of the magnets are aligned to the rotational axis of the rotor assembly indicated by the lines R1-R2. The outer and inner rings are aligned in place cooperatively by the rotor hub 120, the rotor frame 304 and the hub frame 124. The hub 120 is sized to be coupled a shaft (not shown in FIG. 4), which turns the rotor assembly.

A radial gap D exists between the outer surface of the inner ring 204 and the permanent magnets 216. The radial gap D is determined by the radii of the inner and outer rings and the thickness of the permanent magnets. As will be explained later, a stator member is interposed between the inner and outer rings, inside the radial gap.

Figure 5:
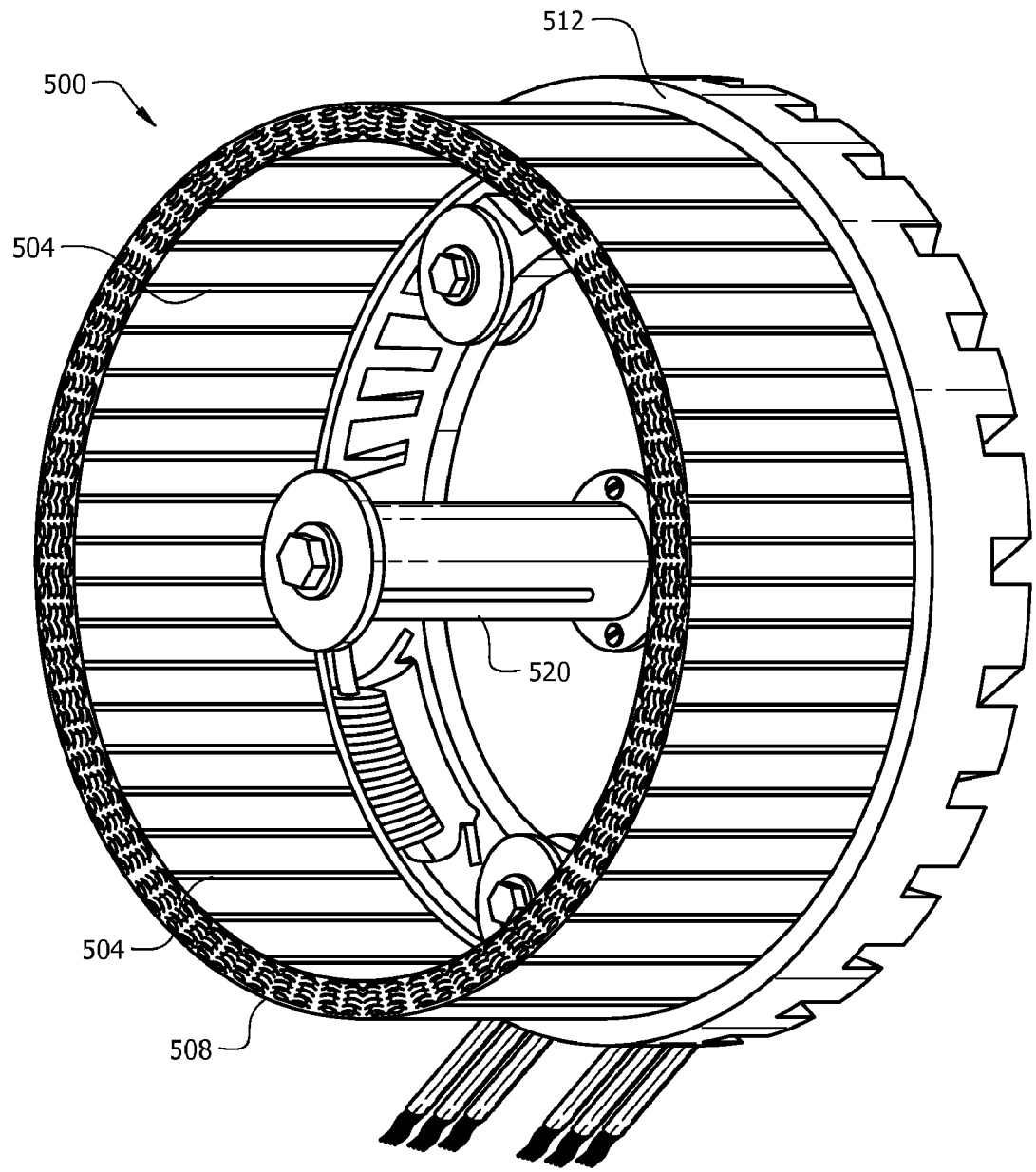
FIG. 5 is a perspective view of a stator assembly.

FIG. 5 is a perspective view of a stator assembly 500 of the permanent magnet electric generator. The stator assembly 500 includes a plurality of stator blocks 504, which are arranged in a ring-shape to form an annular stator member 508. The stator member 508 is wound with a three-phase winding (not shown in FIG. 5), thus forming a ring of wound wires. The precise number of the stator blocks 504 in the stator member 508 can be varied to influence the output characteristics of the generator.

Figure 6:
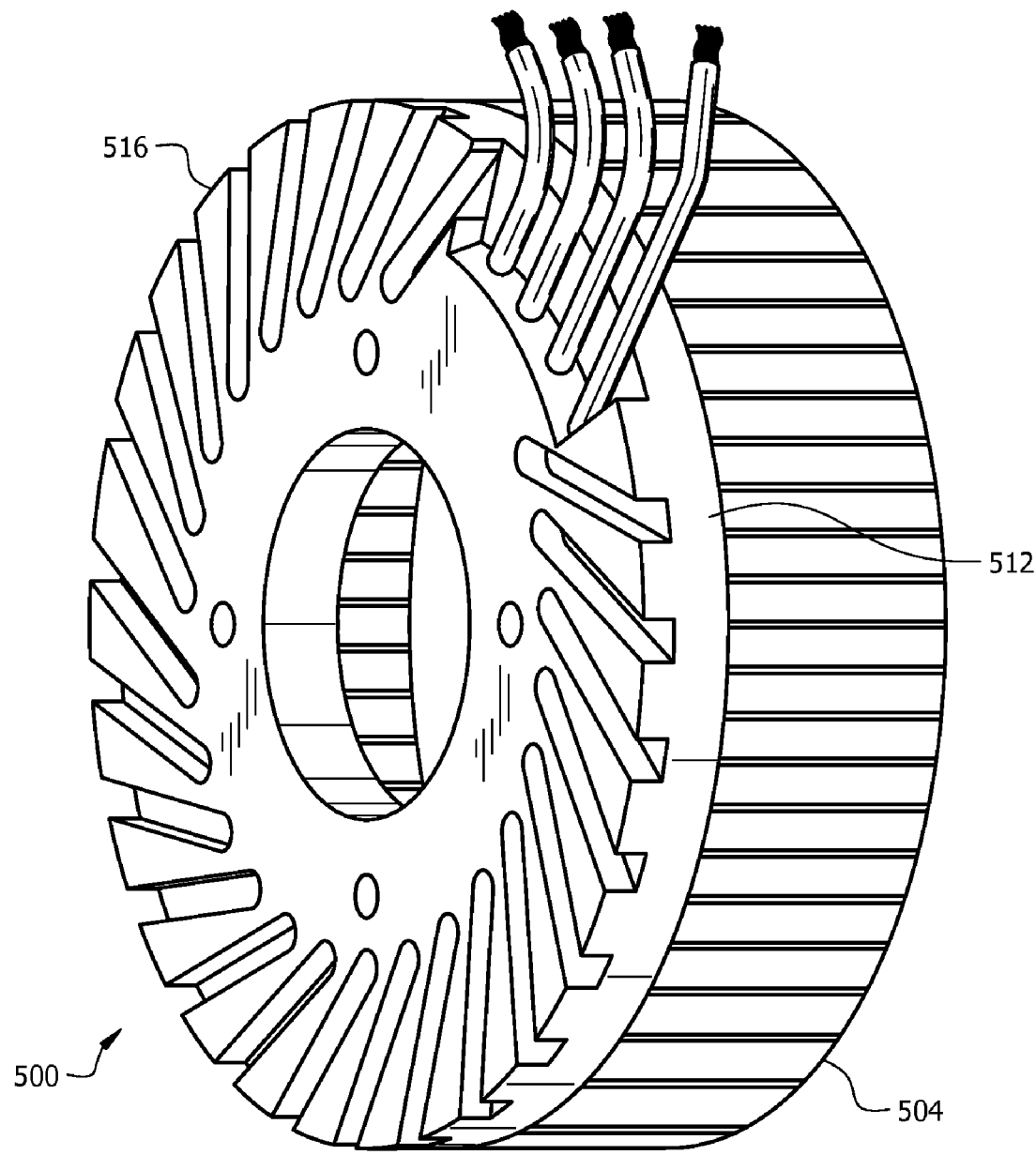
FIG. 6 is a perspective view of the rear side of the stator assembly.

The stator member 508 is firmly mounted on a ring-shaped support member 512 by suitable means in order to retain the stator blocks 504 in alignment. FIG. 6 is a perspective view of the rear side of the stator assembly 500. The ring-shaped support member 512 may include a heat sink 516 sized to be attached to the support member 512. The heat sink 516 may be integrated with the support member 512. The heat sink 516 dissipates the heat generated in the stator assembly during operation. In one embodiment, 6061 type Aluminum may be used to make the heat sink.

A shaft 520 shown in FIG. 5 is encircled by the stator assembly 500. The shaft 520 is rotationally coupled to a source of rotational energy to turn a rotor assembly 100.

Figure 7:
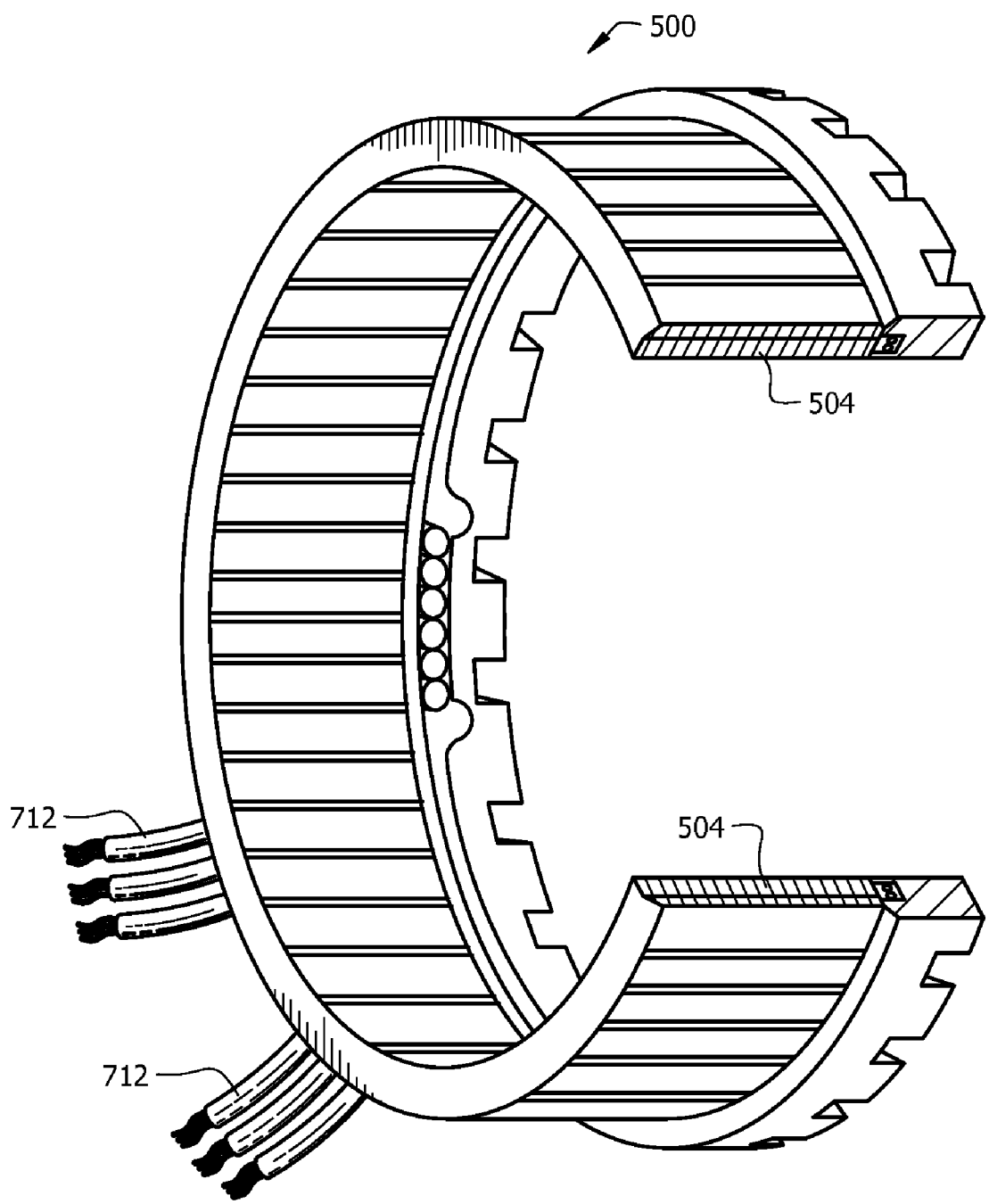
FIG. 7 is a perspective view of an embodiment of the stator assembly with a section removed to illustrate its construction.

FIG. 7 is a perspective view of an embodiment of the stator assembly 500 with a section removed to illustrate its construction. The stator assembly 500 includes a plurality of stator blocks 504 that are wound with a three phase winding 712 for a three-phase voltage output. In one embodiment, the stator blocks 504 are wound in a manner so that three phase winding 712 passes through the gap between adjacent stator blocks 504. The stator blocks 504 are wound up as shown in FIG. 7 so that the three phase windings terminate into three pairs of externally accessible terminals or lead for a three phase voltage output.

Figure 8:
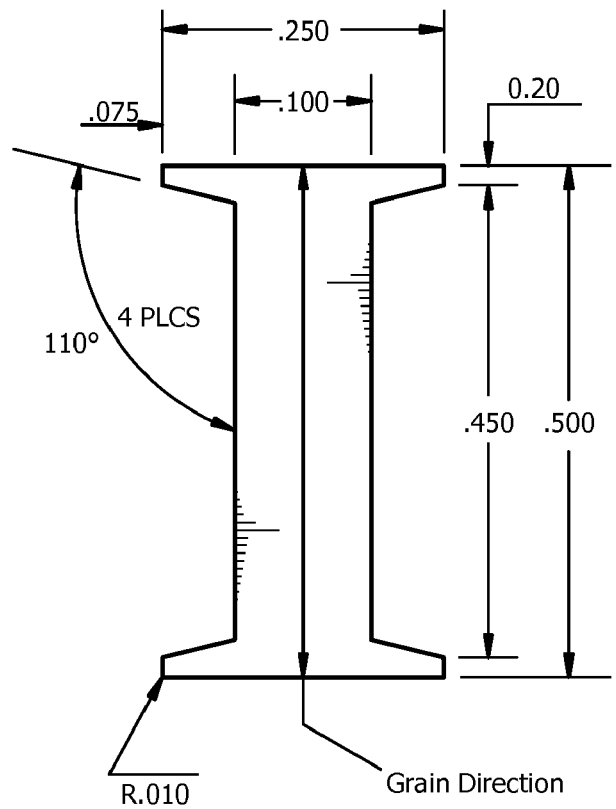
FIG. 8 shows a strip of an I-shaped material that forms the building block of a stator block.
Figure 9:
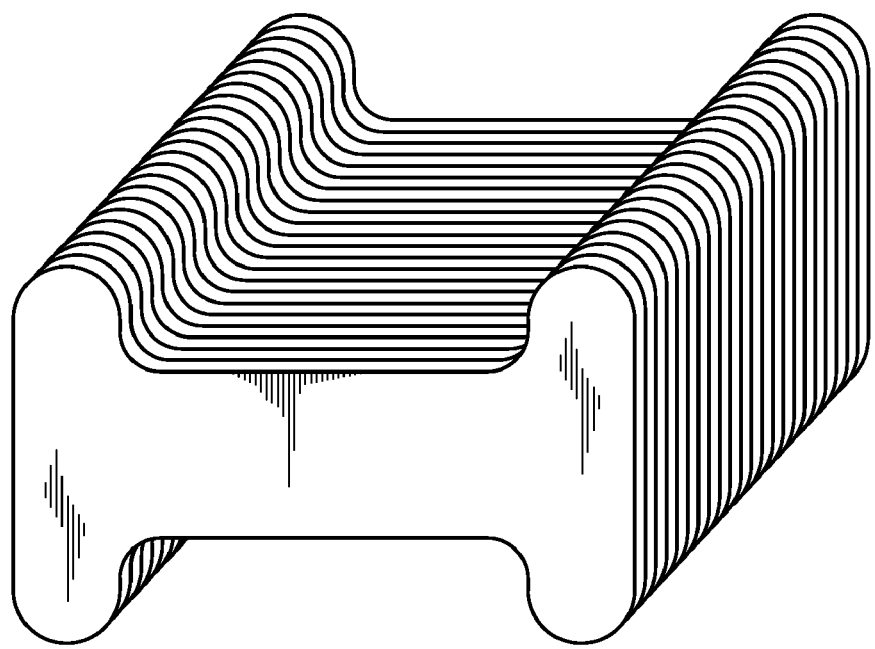
FIG. 9 shows a stator block formed by a stack of the I-shaped strips.
Figure 10:
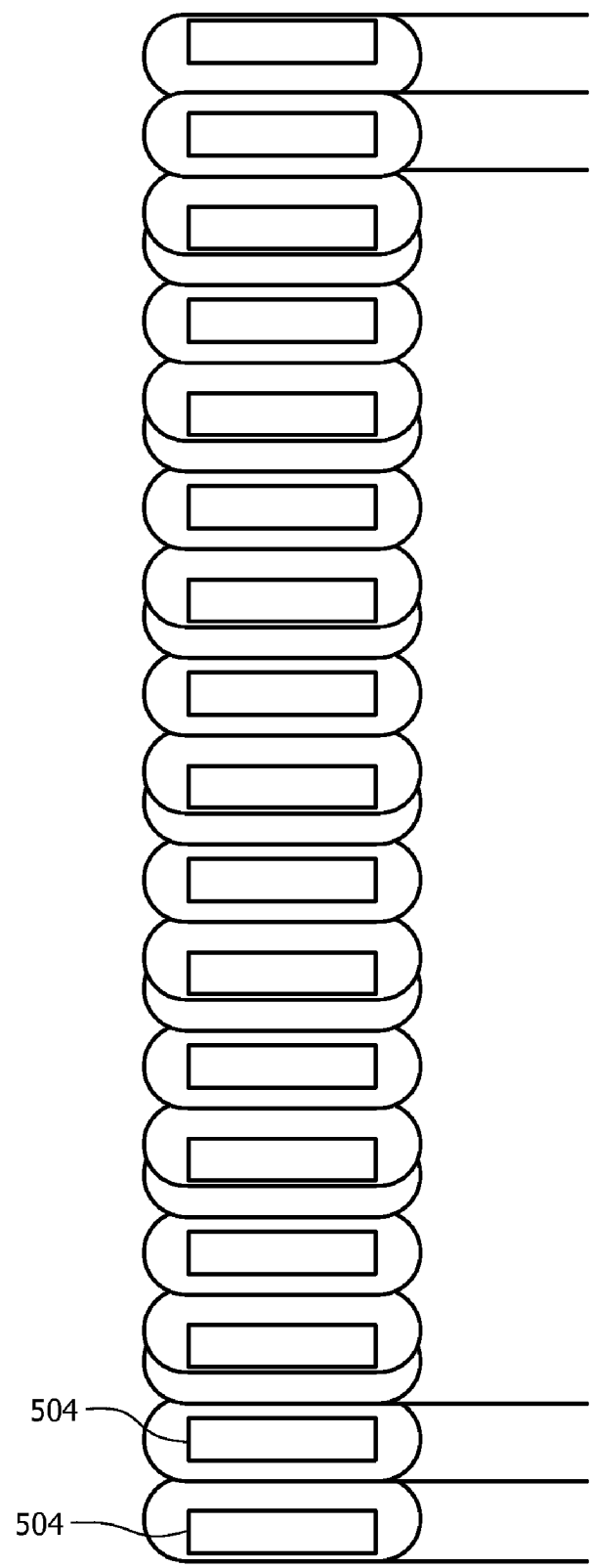
FIG. 10 shows stator blocks wound by a three-phase winding.

In one embodiment, the stator block 504 is formed by stacking a plurality of strips of magnetically, permeable material. In one embodiment, strips of I-shaped magnetically, permeable material are stacked to form a stator block. For example, strips of M6-29 Gage material having consistent grain direction can be used to form a stator block. In one embodiment, Silicon Grade 6 PHML may be used to form the strips. FIG. 8 shows a strip of an I-shaped material that forms the building block of a stator block. FIG. 9 shows a stator block formed by a stack of the I-shaped strips, and FIG. 10 shows stator blocks wound by a three-phase winding.

In one embodiment, after the stator blocks 504 are wound by the three-phase winding, the stator blocks 504 are epoxy potted or otherwise secured together to form a rigid, annular structure. The rigid annular structure is then mounted on the ring-shaped support structure 512 shown in FIGS. 6 and 7.

Figure 11:
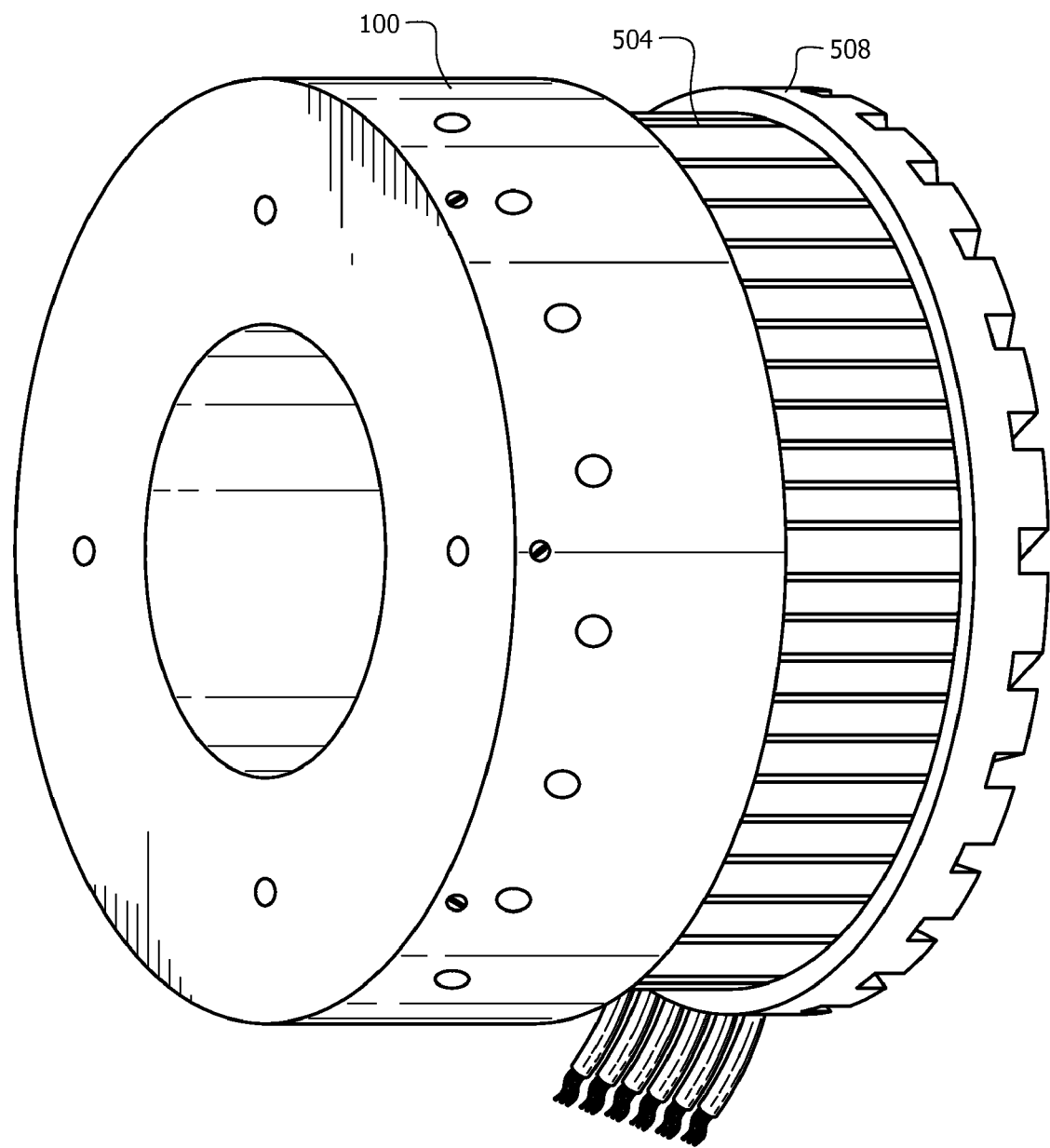
FIG. 11 shows a stator member partially inserted inside a rotor assembly.

FIG. 11 shows the stator member 508 partially inserted inside the rotor assembly 100. As discussed before, the stator member 508 is interposed between the inner and outer rings. When the electric generator is fully assembled, the stator member 508 is circumferentially encircled by the rotor assembly 100. The stator member 508 resides within the radial gap between the inner and outer rings of the rotor assembly. Thus, the rotor assembly 200 rotates encircling the stator member 108. As shown in FIG. 11, leads of the three phase winding for a three-phase output are accessible.

As will be appreciated by those skilled in the art, upon assembly the stator member 508 is encircled by the outer ring 104 of the rotor assembly 100, while the inner ring 112 of the rotor assembly is encircled by the stator member 508. During operation, each stator block 504 can supply a specific amount of current at a specific voltage, depending on the construction of the stator block 504 and the rotational force of the magnets attached to a rotor assembly passing in close proximity to the stator blocks 504. Based on the principle that moving magnets create electrical currents in closed circles of wire, electrical energy is generated when the rotor assembly 100, rotationally coupled to a source of rotational energy, is rotated at high speed encircling the stator member 508.

As will be appreciated, only the stator assembly 500, which is the stationary member, has windings. The rotor assembly 100, which is the rotational member, does not include any winding. As such the generator does not require any brush contacts, which makes the generator reliable and relatively maintenance free.

Figure 12:
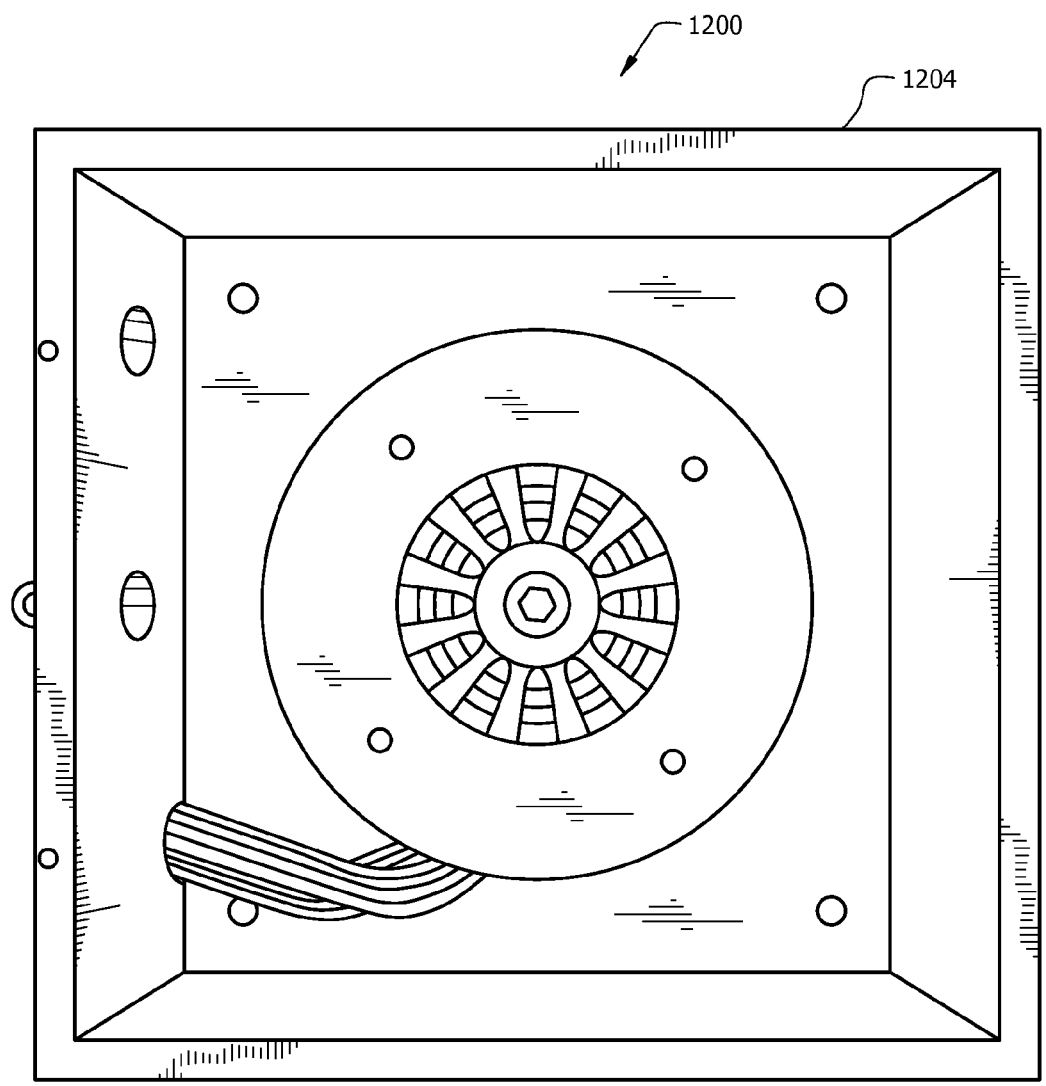
FIG. 12 illustrates a permanent magnet electric generator in accordance with one embodiment.

FIG. 12 illustrates a permanent magnet electric generator 1200 in accordance with one embodiment. The generator includes a housing 1204 which houses the stator assembly and the rotor assembly discussed above. The shaft is rotationally coupled to a source of rotational energy to rotate the rotor assembly (not shown in FIG. 12).

In one embodiment, 24 permanent magnets were attached to the inner surface of the outer ring 104. In one embodiment, the permanent magnets were made from H27 type material. In one embodiment, 73 stator blocks were used to construct the stator member. In one embodiment, Silicon grade M29 laminations were used to construct the stator blocks.

It will be apparent to those of skill in the art that the number of stator elements 104 and the magnets may be varied to suit the desired characteristics of the generator. Also, the relative size and precise configuration of various components and elements of the generator may be varied.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A rotor assembly for a permanent magnet electric generator for generating a three-phase AC, comprising:
    a three-phase winding disposed inside the electric generator and configured to conduct the three-phase AC;
    an axially disposed annular outer ring being concentric with an axis of rotation;
    an axially disposed laminated annular inner ring being concentric with the axis of rotation, the laminated inner ring being formed by a plurality of thin, ring-shaped magnetically permeable material, the inner ring having a radius less than the radius of the outer ring, and the inner ring being disposed inside the outer ring;
    a rotor frame attached to the inner ring and the outer ring to define a radial gap between the inner and the outer rings;
    a rotor hub concentric with the axis of rotation and disposed inside the inner ring, the rotor hub being coupled to the inner ring by a hub frame mounted on the rotor hub, the rotor hub adapted to be rotationally coupled to a shaft for rotating the rotor assembly to generate the three-phase AC in the three-phase winding; and
    a plurality of magnets disposed on the outer ring, each magnet having a north pole and a south pole.

2. The rotor assembly of claim 1, wherein the magnets are distributed on the inner surface of the outer ring.

3. The rotor assembly of claim 1, wherein the permanent magnets are aligned with the axis of rotation and adjacent magnets have alternating polarity.

4. The rotor assembly of claim 1, wherein the hub frame includes a plurality of radially disposed blades attached to the inner ring.

5. The rotor assembly of claim 1, wherein the hub frame is made from an insulating material.

6. The rotor assembly of claim 1, wherein the rotor frame is made from an insulating material.

7. The rotor assembly of claim 1, wherein the outer ring is made from a magnetically permeable material.

8. The rotor assembly of claim 1, wherein the inner ring is made from a plurality of thin, ring-shaped magnetically permeable material.

9. A rotor assembly for a permanent magnet electric generator for generating a three-phase AC, comprising:
    a three-phase winding disposed inside the electric generator and configured to conduct the three-phase AC;
    an axially disposed annular outer ring being concentric with an axis of rotation, the outer ring being made from a magnetically permeable material;
    an axially disposed laminated annular inner ring being concentric with the axis of rotation, the inner ring having a radius less than the radius of the outer ring, the inner ring being disposed inside the outer ring, and the inner ring made from a plurality of thin ring-shaped elements;
    a rotor frame attached to the inner ring and the outer ring to define a radial gap between the inner and the outer rings, the radial gap configured to receive a stator assembly wherein the stator assembly is partially disposed between the inner and the outer rings;
    a rotor hub concentric with the axis of rotation and disposed inside the inner ring, the rotor hub being coupled to the inner ring by a hub frame mounted on the rotor hub, the rotor hub adapted to be rotationally coupled to a shaft for rotating the rotor assembly to generate the three-phase AC in the three-phase winding; and
    a plurality of magnets disposed on the outer ring, each magnet having a north pole and south pole.

10. The rotor assembly of claim 9, wherein the permanent magnets are distributed on the inner surface of the outer ring.

11. The rotor assembly of claim 9, wherein the permanent magnets are aligned with the axis of rotation and adjacent magnets have alternating polarity.

12. The rotor assembly of claim 9, wherein the hub frame includes a plurality of radially disposed blades attached to the inner ring.

13. The rotor assembly of claim 9, wherein the hub frame is made from an insulating material.

14. The rotor assembly of claim 9, wherein the rotor frame is made from an insulating material.

* * * * *